United States Patent Office 3,075,388
Patented Jan. 29, 1963

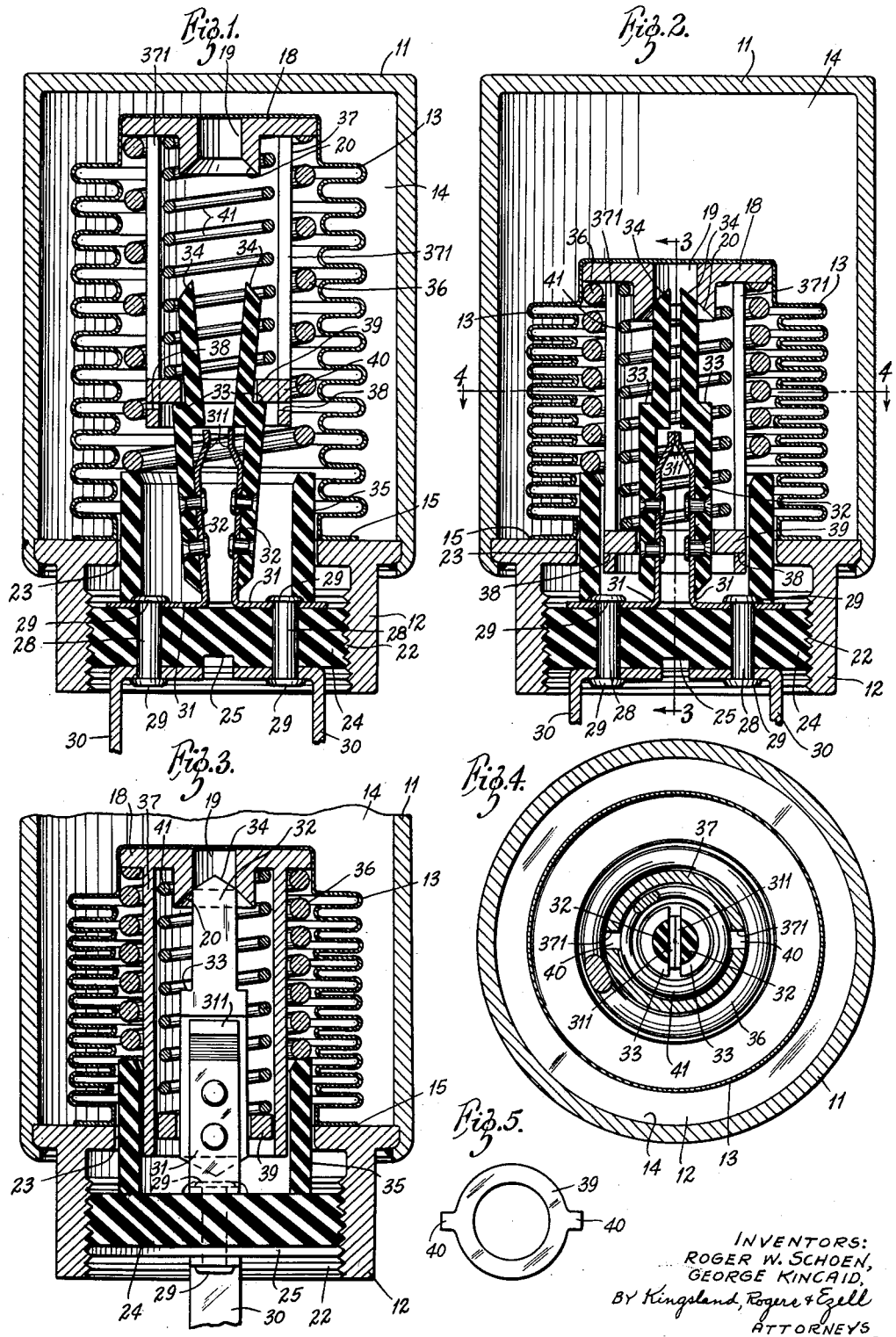

3,075,388
NON-RECYCLING THERMOSTATIC SWITCH
Roger W. Schoen, Ferguson, and George F. Kincaid, Kirkwood, Mo., assignors to Alco Valve Company, St. Louis, Mo., a corporation of Missouri
Filed Nov. 7, 1958, Ser. No. 772,611
14 Claims. (Cl. 73—368.7)

The present invention relates to an automatic actuating device and more particularly to a novel automatic actuating device responsive to changes in actuating forces which will remain in actuated position through a predetermined range of changes in the actuating forces.

In brief, the embodiment of the herein illustrated invention contemplates a unique switching arrangement wherein a bellows, actuated by a temperature-responsive compound, closes electrical contacts when a predetermined high temperature is reached. Immediately upon closing of said contacts a spring-urged member is released to hold said contacts closed. In this condition the bellows is free to expand and contract within a range without affecting the contacts. When a predetermined low temperature is reached, a sleeve carried by the bellows returns the spring-urged member to its original position, thereby permitting the electrical contacts to reopen. With the contacts in the open position, a second predetermined range of temperatures may be passed through, during which the bellows may expand and contract, before a predetermined high temperature, different from the previous contacts-opening temperature, is reached, at which the contacts are again closed. Thus, there is a predetermined high range of temperatures before the contacts are closed and thereafter a predetermined low range of temperatures before the contacts are again opened.

An object of the present invention is to provide an automatic device to indicate if a substance has been subjected to a temperature above a predetermined critical value.

Another object of the invention is to provide an automatic device to indicate if a substance has been subjected to a temperature below a predetermined critical value.

Still another object of the invention is to provide a non-recycling thermostatic switch in which the application of temperature above any normally encountered temperature will reset it, thus permitting routine testing and inspecting procedures.

A further object of the invention is to provide a non-recycling thermostatic switch in which a switch will remain in one of its positions through a predetermined range of temperatures above a predetermined critical low temperature, and in a different position throughout a different range of temperatures below a predetermined high temperature.

A still further object of the invention is the provision of an automatic indicating device having a high critical temperature and a low critical temperature, both of which may be varied by a single adjustment. And an especial object is the provision of such a control wherein the two temperatures differ by a predetermined differential, which differential is not changed by the foregoing adjustment of the critical on-and-off temperatures.

Other objects will appear from the description to follow.

In the drawings:

FIGURE 1 is an elevation cross-section showing the invention with the bellows in the expanded condition and the contact in the open position;

FIGURE 2 is a view similar to FIGURE 1, with the bellows in the contracted condition and the contact in the closed position;

FIGURE 3 is an elevation cross-section taken along the lines 3—3 of FIGURE 2;

FIGURE 4 is a plan cross-section taken along the lines 4—4 of FIGURE 2; and

FIGURE 5 is a plan view of the annular member.

Referring now more particularly to the drawings, there is a container 11 for a temperature responsive compound, which may be any fluid whose volume varies with changes in the fluid temperature. The container 11 is illustrated as a closed top cylinder. Its open bottom is closed by a base member 12, having a flanged circular top received and sealed in a groove in the lower inner surface of the container 11.

A bellows 13 comprising a flexible member has its lower end hermetically sealed, as indicated at 15, to the base member 12. The opposite end of the bellows 13 is closed. The container and bellows thus provide an expansion (and contraction) chamber 14, containing the temperature responsive fluid, and having a movable actuating wall in the form of the top wall of the bellows 13.

The bellows 13 receives an actuator member 18 in its upper end. The actuator 18 is formed with a flared opening 19, having a beveled actuating surface 20.

The inner surface of the base member 12 is threaded as shown at 22. Its top flange is provided with a central circular opening 23 for a purpose to appear. An insulator 24 is threaded to correspond to the threads 22 of the base member 12, so that it may be screwed into that base member. The insulator 24 is grooved at 25 to facilitate insertion of that insulator by a screw driver, coin, or other tool.

Disposed on different radii of the insulator 24 are two channels containing conducting rivet pins 28. Each of the conducting pins 28 has, at opposite ends thereof, a head 29 for securing certain conductors. Secured at the lower end of each pin 28, as viewed in FIGURE 1, is a conductor 30 that may be connected in a circuit such as one including a lamp or other indicating device, not shown.

At the upper end of each contact pin 28 is secured a contact 31. The contacts are generally L-shaped with their upper free ends 311 offset toward each other. Each of the contacts 31 is formed at a spring material normally urging the free ends 311 apart to the position shown in FIGURE 1.

Riveted to each of the contacts 31 is an actuating finger 32 made of insulating material. The actuating fingers 32 are formed with outwardly disposed shoulders 33 midway thereof and beveled edges 34 at their upper ends, to correspond to the beveled edge 20 of the actuator 18. Where the contacts 31 are released, the apexes of the edges 20 are separated less than the bottom diameter of the edge 20 of the actuator, as will appear.

Adjacent to and mounted upon the insulator 24 is a spring support 35. Extending between the spring support 35 and the actuator 18 is a helical bellows-loading spring 36, the upper end of which engages the under surface of the actuator 18, thereby applying a load to the bellows opposing its collapse by the thermal fluid.

Extending from the actuator 18 and attached thereto or integrally formed therewith is a sleeve 37 having two slots 371, shown at FIGURE 4, terminating at 38, short of the lower end of the sleeve 37, as viewed in FIGURES 1 and 2. A ring 39 having two projections 40 extending within the slots 371 of the cylinder 37, is movable along the length of the slots 371. Extending between the ring 39 and the actuator 18 is a second helical spring 41. The helical spring 41 urges the ring 39 toward the lower end of the cylinder 37 as viewed in FIGURE 1. The spring 41 is, in the preferred embodiment, of less strength than the spring 36, although the relationship between the two may be varied as desired.

Operation

One use of this device is to indicate automatically whether a substance such as a fuel has been subjected to a temperature below a critical temperature. The device must indicate such a condition, and must remain in the indicating position, regardless of certain changes in ambient temperatures through a predetermined range.

The operation of the novel thermostatic switch is as follows:

It is assumed that the instrument is located at a place, the temperature of which is to be sensed, so that the thermal fluid within the chamber 14 may expand and contract in response thereto. There may be the usual bulb (not shown) for remote sensing, as will be understood.

In the condition shown in FIGURE 1, the temperature being sensed by the device is relatively cool. Consequently, the temperature responsive fluid in the chamber 14 is in non-expanded condition. The bellows is expanded under the force of the spring 36, and the ring 39 has been lifted by the limits 38 at the bottom of the slot over the shoulders 33, and is urged downwardly by virtue of the force of the spring 41.

As the temperature of the fuel being tested rises, the temperature responsive fluid expands, forcing the bellows to contract against the force of the spring 36. As the bellows contracts, the shoulders 33 of the actuating fingers 32 maintain the ring 39 in the position shown in FIGURE 1, permitting the spring 41 to become compressed. It will be noted that the bellows 13 is free to expand and contract a substantial distance between the upper position shown in FIGURE 1 and a lower position immediately above actuator fingers 32 without affecting the open condition of the contacts 31. In other words, the movement of the bellows 13 does not affect the contacts 31 until the expansion of the compound, due to a rise in the temperature of the substance being tested to a predetermined temperature, is sufficient to compress the bellows 13 to a point where the beveled edge 20 of the actuator 18 engages the corresponding beveled ends 34 of the actuator fingers 32. When this condition is reached, further contraction of the bellows 13 and consequent downward movement of the actuator 18 causes each actuator finger 32 to pivot toward the other about the angle 42 of each contact 31. This forces the contact ends 311 together, closing their circuit. Thereupon, the shoulders 33 no longer support the ring 39. The spring 41 being in a compressed condition, and the sleeve 37 being in the position shown in FIGURE 2, the ring 39 is forced by the spring 41 down to the position shown in FIGURE 2.

The ring 39, now riding the outer surface of the actuator fingers 32, will maintain the contacts 31 in a closed position during that predetermined range of warmer temperatures at which the contacts are to remain closed.

As the thermal fluid subsequently contracts, the spring 36 will urge the bellows 13 to an expanded condition, carrying with it the actuator 18 and its sleeve 37. As the sleeve moves up from the position shown in FIGURE 2, the lower portion 38 thereof, engages the projections 40 of the ring 39 and causes the ring 39 to rise.

When a predetermined cooler temperature has been reached, the ring 39 will have risen to a point just above the notches 33 of the actuator fingers 32. The spring force of the contacts 31 will then force the contacts 31 to separate, carrying with them the actuator fingers 32 until the condition shown in FIGURE 1 is reached. It is notable that the contacts can open with a snap, thus enabling the switch to be used with direct current.

The permissible temperature ranges can be varied in several ways. First, the insulator 24 carrying the contacts 31 can be threaded up or down in the view of FIGURE 1, thus varying the force of the loading spring 36, and thereby adjusting the critical temperatures at which the switch elements 311 open and close, as well as adjusting the increment of actuator movement per unit of temperature change. Also, the strength of either the spring 36 or the spring 41 may be changed.

In the preferred embodiment, the strength of the spring 36 is relatively large compared to the strength of the spring 41. A unique feature of the invention is the differentials introduced by the existence of the two springs 36 and 41. When the bellows is being contracted from the position shown in FIGURE 1, the actuator 18 is moving against the force of both the spring 36 and the spring 41. Once the ring 39 is released from the notches 33 of the actuator fingers 32, the spring 41 is again expanded to the length shown in FIGURE 1. Thereafter, as the bellows 13 expands, force of the spring 41 is not involved. The ring 39 remains engaged with the projection 38 of the cylinder 36 and the motion of the bellows is influenced by the spring 36 alone. Thus, the spring 41 can be varied in strength, thereby varying the range of lower operating temperatures, during which the contact 31 remains opened, yet without affecting the higher range of temperature during which the contact 31 remains closed. In other words, this spring force differential of the springs 36 and 41 permits separate adjustment of the lower and higher operating temperature ranges.

There has been provided, therefore, a control that will open its contacts when the temperature changes in one direction to a predetermined value. Thereafter the temperature may change in the range beyond that value, without reclosing the switch. Also, the temperature that must be attained, in a reclosing direction, is higher than the temperature of opening, because, to reclose the switch, the thermal fluid must develop a pressure force sufficient to overcome not only the spring 36 but also the spring 41. This differential is determined by the rate of the spring 41, independently of any adjustment of the spring 36 by the plug 24 or the spacer 35.

There has also been provided a control that will close its contacts when the temperature changes in the other direction to a predetermined value different from its contacts opening temperature. Thereafter, once the contacts are closed, temperatures may change within the range above the previously described contacts opening temperature, without affecting the switch.

As applied to the sensing of fuel temperature, the control device may indicate when the fuel has been subjected to temperatures too low to permit proper flow or burning thereof, and will remain in indicating condition until the temperature has risen to a value at which the fuel may function properly. Thus, if the device is exposed to ordinary outside temperatures, the descent of outside temperature to a value at which the fuel will not flow, or vaporize properly, or may freeze the conduits when passing through restrictions, will initially open the indicating circuit, a control circuit of the device is directly employed to control a system. As long as the ambient temperature remains cold, the circuit remains open. And the ambient temperature must actually rise to a different, higher, point before the contacts may be reclosed. Such higher points, determined by the effect of the spring 41, may be selected as sufficiently higher to reflect an outside temperature change high enough to have overcome the coldness of the fuel or of the system.

Many uses of the device are contemplated. The description has assumed contraction of the bellows upon rise in temperature; but this may be revised, as is known in the art. The device has also been described as temperature responsive. However, it is actuated by pressure changes resulting from a thermal fluid pressure. Obviously, force-producing actuators other than a thermal fluid may be used with the actuating mechanism.

One other valuable property of this invention is that it can be calibrated and tested at any time. Conventional controls of this type are non-resettable. When hermetically sealed, they cannot be checked. The present control obviously can be reset by being subjected to temperatures beyond its critical temperatures, thus permitting routine testing and inspection.

It is most convenient to have the actuating mechanism operate a switch. However, the members 31 may be mechanical elements as well as electrical ones, and yet employ some of the advantages of this invention.

In considering the nature of this device, it may be observed that the actuator 18 and the ends 38 of the sleeve 37 perform the basic actuating functions of the mechanism, and may be called the spaced actuating and returning elements thereof. They together constitute the actuating member, to which may be added the pressure chamber system of the bellows 13 and spring 36.

The two contacts 31 constitute the actuatable elements, along with their associated parts 32. While two are preferably movable, one alone can move and attain many advantages of the system. The ring 40 has the functions of a latch, since it is operable into latched position by the returning element 38 of the actuating mechanism, and is releasable to released position wherein it holds the actuatable element in the latter's second position. The maximum spacing between the actuating element 29 and the contact points 34 represents the range of operation of the device with contacts open; while the maximum spacing between the shoulders 33 and the return elements 28 represents the range of operation with contacts closed.

With the foregoing illustrative embodiment of the device, it will be appreciated that the inventive scope is to be determined only from the nature of the claims which follow.

What is claimed is:

1. An automatic indicating device for indicating the temperature of a test substance as being above a first critical temperature in one condition of the device and below a second critical temperature in another condition of the device, comprising an indicator means characterized by a first indicating position and a second indicating position, said indicator means being normally biased toward said first indicating position, temperature responsive means biased against a change from a first predetermined temperature condition, said temperature responsive means being movable between said first predetermined temperature condition and a condition corresponding to said first critical temperature while said indicator means remains in said first indicating position, said indicator means being forced to said second indicating position when said temperature responsive means moves beyond said first critical temperature condition (and means controlled by said temperature responsive means and said indicator means to maintain said indicator means in said second indicating position through a temperature range above said second critical temperature).

2. In a control of the kind described, an actuating member movable forward and backward, having spaced actuating and returning elements; means for moving the actuating member forward and backward, an actuatable member movable to first and second positions and yieldably urged to its first position, the actuating element of the actuating member being adapted to engage the actuatable member upon a predetermined forward movement of the actuating member and move the actuatable member to its second position; a latch having a latching position in which it is held against movement by the actuatable member when the latter is in its first position and having a released position to which it is movable when the actuatable member is moved to its second position, yieldable means urging the latch toward its released position; the latch in its released position engaging the actuatable member and holding it in its second position, the latch in its released position being engageable by the returning element of the actuating member and being movable thereby back to latching position when the actuating member moves backward.

3. The combination of claim 2, wherein the actuating member comprises a pressure chamber having a movable wall, the actuating and returning elements being connected to the movable wall.

4. The combination of claim 3, wherein the pressure chamber contains a temperature responsive expansible fluid.

5. The combination of claim 3, wherein the movable wall is moved in one direction by pressure changes in the pressure chamber, and yieldable force means urging it in the other direction.

6. The combination of claim 5, including means to adjust the force of the yieldable force means.

7. The combination of claim 2, wherein the actuatable member has movement transversely to that of the actuating member, and has a shoulder engageable by the latch when the latch is in first position; and wherein the actuating element of the actuating member engages the actuatable member and moves it transversely to displace the shoulder from the latch.

8. An automatic control comprising a movable actuator, means for moving the actuator between first and second positions, an indicator movable between first and second indicating positions, means for biasing the indicator toward the first indicating position, means controlled by movement of the actuator to the second actuator position for moving the indicator to the second indicating position, a latch movable from a non-latching position to a latching position for maintaining the indicator in the second indicating position, means controlled by the indicator for preventing the latch from moving to the latching position when the indicator is in the first indicating position, means for moving the latch to latching position when the indicator is moved to the second indicating position, means controlled by the movement of the actuator from its second actuator position toward its first actuator position for moving the latch toward its non-latching position, and means for retaining the latch in latching position while the actuator moves from the second actuator position a substantial distance toward the first actuator position.

9. The combination of claim 8 including means controlled by the movement of the actuator toward its first actuator position for moving the latch to its non-latching position, and thereby permitting the biasing means to move the indicator toward the first indicating position, when the actuator moves a predetermined distance away from the second actuator position.

10. An automatic control comprising an indicator movable between a first indicating position and a second indicating position, means for biasing the indicator toward the first indicating position, an actuator, means for moving the actuator between a first actuator position and a second actuator position, the actuator including means for moving the indicator from the first indicating position to the second indicating position upon movement of the actuator to the second actuator position, means for maintaining the indicator in the second indicating position, and means controlled by the movement of the actuator a substantial distance toward the first actuator position for releasing the indicator from the maintaining means and thereby permitting the biasing means to move the indicator to the first indicating position.

11. The automatic control of claim 10 wherein the indicator includes a movable finger having a first surface engageable by the maintaining means when the indicator is maintained in the second indicating position, and the maintaining means comprises an element slidable along the first surface of the finger to maintain the indicator in the second position, the actuator having means for moving the maintaining element along the first surface and beyond the first surface to release the finger from the maintaining element after a predetermined movement distance of the actuator toward the first actuator position.

12. The automatic control of claim 11 wherein the indicator has means for preventing the maintaining element from moving into engagement with the first surface prior to substantial movement of the actuator from the first actuator position toward the second actuator position.

13. The indicator of claim 12 wherein the means for preventing the maintaining element from moving into engagement with the first surface comprises a notch on the indicator rod for blocking the maintaining element when the actuator is in its first indicating position.

14. The indicator of claim 13 wherein the movement of the actuator is controlled by the expansion and contraction of a temperature responsive fluid.

References Cited in the file of this patent
UNITED STATES PATENTS

| | | |
|---|---|---|
| 1,010,414 | Cubitt | Dec. 5, 1911 |
| 2,102,656 | Vaughn | Dec. 21, 1937 |
| 2,269,776 | Lindemann | Jan. 13, 1942 |